(12) United States Patent
Browne et al.

(10) Patent No.: US 9,762,855 B2
(45) Date of Patent: Sep. 12, 2017

(54) SHARING PHYSICAL WHITEBOARD CONTENT IN ELECTRONIC CONFERENCE

(71) Applicant: GetGo, Inc., Boston, MA (US)

(72) Inventors: Jeffrey C. Browne, San Francisco, CA (US); Florian M. Winterstein, Rolling Hills Est, CA (US)

(73) Assignee: GetGo, Inc., Boston, MA (US)

( * ) Notice: Subject to any disclaimer, the term of this patent is extended or adjusted under 35 U.S.C. 154(b) by 0 days.

(21) Appl. No.: 14/644,494

(22) Filed: Mar. 11, 2015

(65) Prior Publication Data

US 2015/0271446 A1    Sep. 24, 2015

Related U.S. Application Data

(60) Provisional application No. 61/955,093, filed on Mar. 18, 2014.

(51) Int. Cl.
*H04N 7/15* (2006.01)
*H04L 12/18* (2006.01)

(52) U.S. Cl.
CPC ........... *H04N 7/15* (2013.01); *H04L 12/1827* (2013.01)

(58) Field of Classification Search
USPC ...................................................... 348/14.08
See application file for complete search history.

(56) References Cited

U.S. PATENT DOCUMENTS

| 6,674,426 B1* | 1/2004 | McGee | G06F 3/038 |
| | | | 178/18.01 |
| 2007/0222747 A1* | 9/2007 | Kritt | H04L 12/1827 |
| | | | 345/156 |
| 2012/0062594 A1* | 3/2012 | Campbell | G06F 3/005 |
| | | | 345/632 |
| 2015/0106755 A1* | 4/2015 | Moore | G06F 3/0484 |
| | | | 715/765 |

FOREIGN PATENT DOCUMENTS

EP    1564682 A2    8/2005

OTHER PUBLICATIONS

International Search Report for International Application No. PCT/US2015/019888, mailed from the International Authority on May 18, 2015, 12 pages.

* cited by examiner

*Primary Examiner* — Amal Zenati
(74) *Attorney, Agent, or Firm* — BainwoodHuang

(57) ABSTRACT

A technique for sharing a physical target board over an electronic conference includes transforming live video from a webcam into output video that provides an enhanced view of the physical target board. The output video is shared with one or more computing machines of conference participants to enable such participants to see the enhanced view of the physical target board in real time. The conference participants can thus enjoy enhanced images of the physical board and its content, which would otherwise be difficult or impossible to see.

17 Claims, 10 Drawing Sheets

SHARING PHYSICAL WHITEBOARD CONTENT IN ELECTRONIC CONFERENCE

CROSS-REFERENCE TO RELATED APPLICATIONS

Priority is claimed to U.S. Provisional Application No. 61/955,093, filed Mar. 18, 2014, the contents and teachings of which are incorporated herein by reference in their entirety, with the same effect as if set forth explicitly herein.

BACKGROUND

Electronic conferencing services, such as web conferencing, video conferencing, and web casting, provide essential means by which people can communicate and collaborate. As is known, two or more people may conduct an electronic conference over a computer network, such as the Internet, using conferencing software running on local computing machines. Each participant in an electronic conference operates a computing machine (e.g., desktop computer, laptop computer, smart phone, tablet, etc.), which may include, or connect to, a webcam and/or microphone. Participants can speak to one another via their webcams and/or microphones, see one another on their displays, and hear one another through their speakers or headphones. In this manner, electronic conferencing simulates face-to-face communication.

Coworkers and other groups often use electronic conferencing to collaborate on projects and/or other endeavors. To this end, some electronic conferencing applications provide virtual whiteboards. Virtual whiteboards display virtual surfaces on which conference participants can draw and make notes. A virtual whiteboard generally occupies a display region on each conference participant's machine, and conference participants can mark on the virtual whiteboard using their pointers, keyboards, and/or other input devices. A virtual whiteboard is normally shared across machines of all conference participants, so that any participant can mark on the virtual whiteboard and see marks that other participants have made.

SUMMARY

Despite the availability of virtual whiteboards in electronic conferencing applications, many people continue to enjoy the use of physical target boards (e.g., physical whiteboards, chalkboards, flip-charts, cork boards, and the like, which people can draw on and/or erase from.

Participants in electronic conferences sometimes wish to share their physical target boards with other conference participants. To share a physical board, a conference participant may simply point his or her webcam toward the board. The participant may then indicate various features on the board and/or make changes to board's contents as the conference proceeds.

Unfortunately, this ad hoc approach to sharing physical target board content is not always optimal. For example, a physical board may be far away from a webcam, oriented at an angle relative to the webcam, and/or in a dark area in the webcam's field of view, such that the board is difficult for remote participants to see and read. Although the person sharing the physical target board may move his or her webcam to acquire a better view of the board, doing so may be inconvenient and is not always feasible. Also, the person sharing the board may temporarily block the board, e.g., when drawing, erasing, pointing out certain features, etc., so that others viewing the board from their respective machines lose sight of board's contents until the person sharing the board moves out of the way.

In contrast with the above-described ad-hoc approach, which can result in board images that are difficult to see by remote conference participants, an improved technique for sharing a physical target board over an electronic conference includes transforming live video from a webcam into output video that provides an enhanced view of the physical target board. The output video is shared with one or more computing machines of conference participants to enable such participants to see the enhanced view of the physical target board in real time. The conference participants can thus enjoy enhanced images of the physical board and its content, which would otherwise be difficult or impossible to see.

The output video may depict markings, such as text, sketches, etc., which have been applied to the physical target board and which conference participants desire to see. In some circumstances, these markings may be temporarily blocked. For example, the person sharing the physical target board may step in front of the board, or a portion thereof, e.g., while applying new markings or erasing old ones. To address these circumstances, some embodiments of the improved technique may further include displaying, in the output video, images of the person or thing blocking the board, while superimposing thereon image content from markings acquired earlier. Thus, for example, the output video is made to include images of both the person blocking the board and the underlying board content, which is currently hidden from the webcam. Remote conference participants can thus see live video of the person sharing the board, while at the same time having the impression of seeing through the person to the board content that lies behind the person. Advantageously, remote conference participants can benefit from a view of the person, being able to see all gestures, expressions, and movements, while simultaneously enjoying a continuous and uninterrupted view of the underlying physical target board content.

Certain embodiments are directed to a method of sharing physical target boards in electronic conferences. The method includes capturing video by a camera of a computing machine participating in an electronic conference, the camera oriented to include a physical target board in its field of view. The method further includes transforming the captured video to generate output video, the output video providing an enhanced view of the physical target board. The method still further includes transmitting the output video to a set of other computing machines participating in the electronic conference, to enable a user of each of the set of other computing machines to see the enhanced view of the physical target board from the respective computing machine.

Other embodiments are directed to a computerized apparatus constructed and arranged to perform a method of sharing physical target boards in electronic conferences, such as the method described above. Still other embodiments are directed to a computer program product. The computer program product includes a set of non-transitory, computer-readable media having instructions which, when executed by a controller of a computerized apparatus, cause the controller to perform a method of sharing physical target boards in electronic conferences, such as the method described above. Some embodiments involve activity that is performed at a single location, while other embodiments involve activity that is distributed over a computerized environment (e.g., over a network).

Still other embodiments are directed to a method of acquiring images of physical target boards. The method includes capturing video by a camera, the camera oriented to include a physical target board and a person within its field of view. The method further includes generating a first video stream from the captured video, the first video stream conveying an unobstructed view of the physical target board, and generating a second video stream from the captured video, the second video stream conveying live content that includes a view of the person blocking a portion of the physical target board. The method still further includes combining the first video stream and the second video stream to generate combined video, the combined video showing the unobstructed view of the physical target board superimposed with the view of the person and storing the combined video stream in a set of storage media.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for sharing a physical target board over an electronic conference includes transforming live video from a webcam into output video that provides an enhanced view of the physical target board. The output video is shared with one or more computing machines of conference participants to enable such participants to see the enhanced view of the physical target board in real time.

Figure 1:
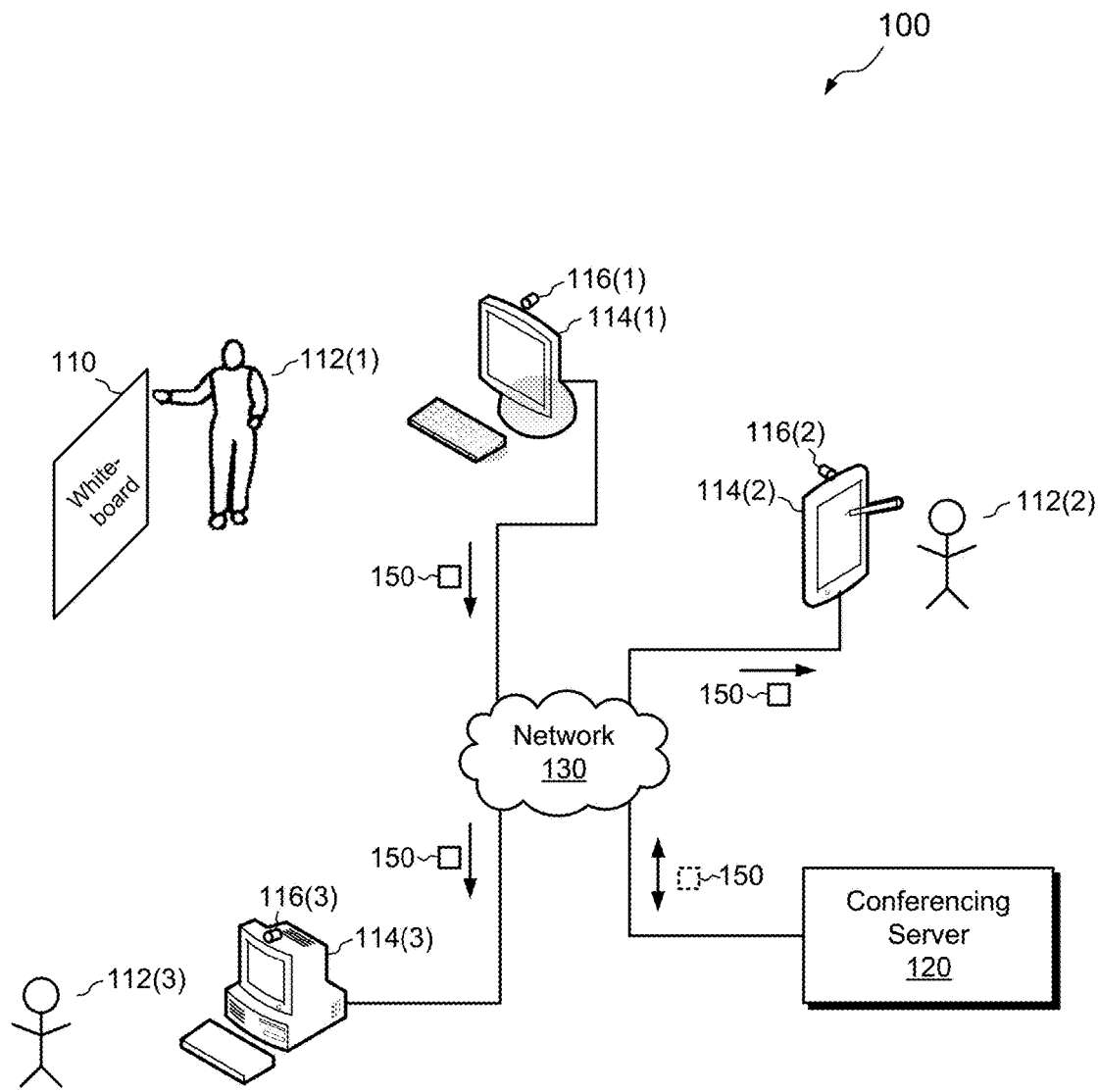
FIG. 1 is a block diagram of an example environment in which the improved techniques hereof can be practiced, which includes multiple computing machines participating in an electronic conference over a network.

FIG. 1 shows an example environment 100 in which embodiments of the improved technique hereof can be practiced. Here, multiple computing machines, shown as machines 114(1) through 114(3), connect to a network 130. Any number of computing machines may be provided. In some examples, a conferencing server 120 also connects to the network 130 to facilitate electronic conferences among the computing machines 114(1) to 114(3). The electronic conferences may include web conferences, webcasts, multicasts, or any other types of live conferences in which video from a presenter may be watched by one or more other conference participants.

In an example, each of the computing machines 114(1) to 114(3) has a camera, such as a webcam, shown here as webcams 116(1) to 116(3), respectively. The webcams 116(1) to 116(3) may be built-in webcams, as are commonly found in mobile devices, or they may be external webcams, which may connect to the respective computers, e.g., using a cable or using wireless technology. In some examples, only the computing machine 114(1) has a webcam, as other conference participants may watch but not present such that they do not require cameras or do not use the ones that they have.

In an example, users 112(1) to 112(3) operate the computing machines 114(1) through 114(3), respectively, and the users and their respective machines participate in an electronic conference. In this example, the user 112(1) may act as a presenter in the conference and may show a physical target board 110 ("whiteboard") to other conference participants via the electronic conference. For example, the user/presenter 112(1) points the webcam 116(1) so that it includes the physical target board 110 it its field of view, if it is not pointed that way already, and proceeds to write on or erase from the physical target board, and/or to point out various features. Other conference participants, e.g., users 112(2) and 112(3) can follow along, observing changes to the physical target board 110 as they take place.

In an example, the computing machine 114(1) runs a conferencing client. The conferencing client receives instructions from the presenter 112(1) to identify the physical target board 110 in the field of view of the webcam 116(1) and to transform captured video from the webcam 116(1) into output video 150 that provides an enhanced view of the physical target board 110. The computing machine 114(1) sends the output video 150 to the other computing machines 114(2) and 114(3), where the other conference participants 112(2) and 112(3) can view the enhanced images, e.g., using conferencing clients running on their respective machines. The captured video and output video 150 may take any form that conveys visual content that changes over time. Thus, the term "video" as used herein describes, for example, conventional video formats (e.g., H.264 and H.265), custom video formats, successions of still pictures, and the like, without limitation, and without regard to the rate at which visual information is updated. In some examples, the conferencing server 120 mediates conference communications between computing machines 114(1) to 114(3). In other examples, communications are peer-to-peer, i.e., among computing machines 114(1) to 114(3), directly.

As will be described, enhanced images of the physical target board 110 may include images that are magnified, presented full-screen or nearly so, perspective deskewed, bordered, and/or image processed to improve clarity, for example. Enhanced images may further include superimposed image content of the physical target board 110, acquired with no occluding objects, overlaid with live images. The live images may include the presenter 112(1), thus enabling conference participants 112(1) and 112(3) effectively to see through the presenter 112(1) to the physical target board 110 behind the presenter 112(1) while still being able to see the presenter 112(1) and follow the presenter's gestures, movements, and expressions.

Although it is described that the computing machine 114(1) generates the output video 150, which carries the enhanced images of the physical target board 110, it is understood that other examples are also feasible. For instance, the conferencing server 120, rather than the computing machine 114(1), may generate the output video 150 carrying the enhanced images, or may share some of the processing burden with the computing machine 114(1) in generating the output video 150. Also, it is feasible that the computing machines 114(2) and 114(3) may participate in generating the output video 150, as well.

In a particular example, the computing machine 114(1) provides output in two distinct video streams, a first video stream and a second video stream. The computing machines 114(2) and 114(3) each receive the two video streams and combine them upon receipt. Using two video streams promotes efficient bandwidth utilization by avoiding transmission of high-resolution, high-frame-rate video. For example, the first video stream may have higher resolution but lower frame rate, while the second video stream may have lower resolution but higher frame rate. Transmitting these video streams separately greatly reduces the amount of bandwidth required accurately to transmit the video data.

In an example, the first video stream carries image content of the physical target board 110. Although its spatial resolution is typically high, to convey accurate images of the physical target board 110, the first video stream can generally have a low frame rate, as content of the physical target board 110 tends to change slowly. In some examples, the computing machine 114(1) sends new frames of the first video stream only once per second or even once every several seconds, while still keeping pace with changes substantially in real time. The computing machine 114(1) may employ conventional video compression to encode the first video stream prior to transmission; however, this is not required. Alternatively, for example, the computing machine 114(1) may treat the content of the physical target board 110 as a picture, and may compress the picture using conventional techniques, such as JPEG (Joint Photographic Experts Group) or PNG (Portable Network Graphics), for example. Once the computing machine 114(1) sends the picture to the machines 114(2) and 114(3) initially, it may update the picture by sending only changes.

In an example, the second video stream carries live video. The second video stream has a higher frame rate, e.g., to accurately convey the presenter's movements, expressions, and gestures, but it may be provided with relatively low spatial resolution and with a high compression ratio. As will be described, live video may be de-emphasized by design in presented video images, such that it tends to be less clearly visible than are images of the physical target board 110. Thus, reductions in the quality of live video may tend to go largely unnoticed.

It should be understood that the machines 114(1) through 114(3) can be provided in any number and in any suitable form or forms, such as using any of desktop computers, laptop computers, smartphones, tablets, PDAs (personal data assistants), televisions, set-top boxes, and so forth, which are capable of participating in an electronic conference. The network 130 may be implemented using any type of network capable of conveying video data, such as a computer network (WAN, LAN, the Internet, etc.), a cable television network, a satellite network, a cell phone network, an over-the-air broadcast network, or any type of network or combination of networks.

Figure 2:
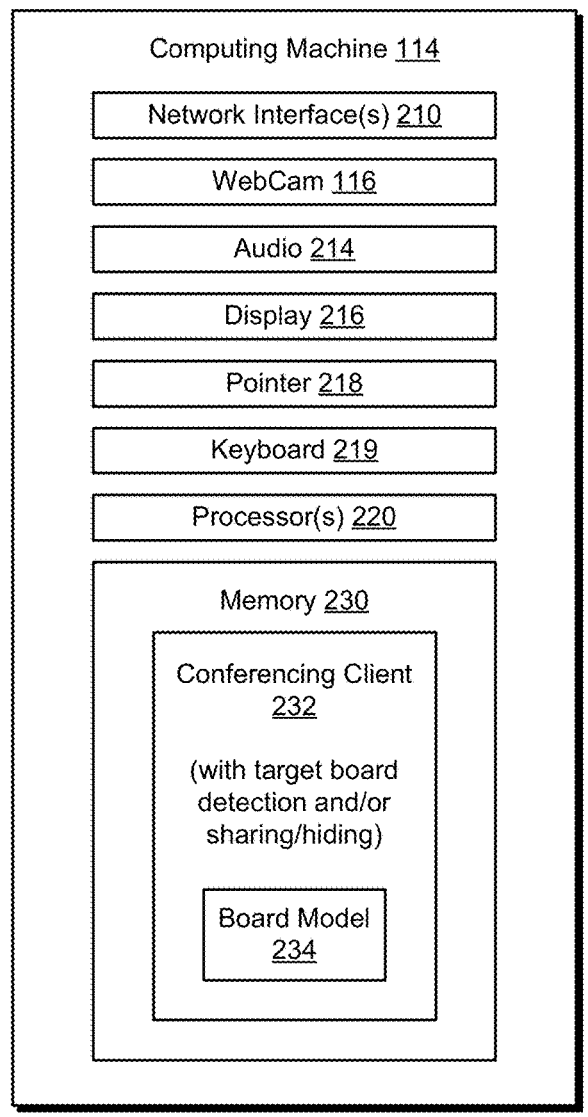
FIG. 2 is a block diagram of an example computing machine of FIG. 1.

FIG. 2 shows an example implementation of a computing machine 114, and is intended to be typical of the machines 114(1) to 114(3). As indicated above, however, different ones of the computing machines 114(1) to 114(3) may be implemented differently. Thus, the example shown in FIG. 2 is merely illustrative.

Here, the computing machine 114 is seen to include a network interface 210, such as an Ethernet, WiFi, cellular, or other adapter, a webcam 116 (like those shown in FIG. 1), audio 214, such as a microphone and speakers, and a display 216, such as a monitor, touchscreen, or other type of screen. The computing machine 114 further includes a pointer 218, such as a mouse, trackball, touchpad, or touchscreen (e.g., integrated with the display 216), a keyboard 219 (e.g., physical or software-implemented), a set of processors 220 (e.g., one or more processing chips and/or assemblies), and memory 230. The memory 230 includes both volatile memory (e.g., RAM) and non-volatile memory, such as one or more disk drives, solid state drives, and the like. The set of processors 220 and the memory 230 together form a controller, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations specified by the software constructs. Although certain software constructs are specifically shown and described, it is understood that the memory 230 typically includes many other software constructs, which are not shown, such as an operating system and various applications, processes, daemons, and so forth.

The memory 230 stores instructions for realizing a conferencing client 232. The conferencing client 232 enables the computing machine 114 to participate in an electronic conference, such as a web conference, webcast, etc. The conferencing client 232 includes the above-described functionality for detecting physical target boards in a field of view of the webcam 116(1) and generating enhanced images of the physical target board 110, which images may be shared with other conference participants.

The conferencing client 232 is seen to include a board model 234. The board model 234 stores an image of the physical target board 110, including all recognized markings made thereon. The board model 234 thus provides a basis for displaying physical target board content even when the presenter 112(1) or other occluding object moves between the webcam 116(1) and the physical target board 110 and blocks the webcam's view of the physical target board 110.

It should be understood that the ability of the conferencing client 232 to identify a physical target board in the field of view of the webcam 116(1) also permits the conferencing client 232 to hide the contents of a physical target board 110. For example, the user 112(1), identified as the presenter above, may need to participate in an electronic conference and share video from the webcam 116(1), but the user 112(1) may wish to hide, rather than to share, the contents of the physical target board 110. For example, the physical target board 110 may include confidential subject matter that should not be seen by other conference participants. In such cases, the user 112(1) may configure the conferencing client 232 to hide the contents of the physical target board 110, e.g., by making the physical target board 110 appear blank, making it appear with a selected color or pattern, or making it display other information content in place of the board's content, such as advertising information.

In some examples, all computing machines 114 run the same or similar versions of the conferencing client 232, such that each user 112(1) to 112(3) can be a presenter and share his or her own physical target board. However, this is not required. For example, the computing machine 114(1) can run a presenter version of the conferencing client 232, which includes physical target board sharing capability, while the other machines 114(2) and 114(3) run audience versions, which do not provide physical target board sharing capability.

Figure 3:
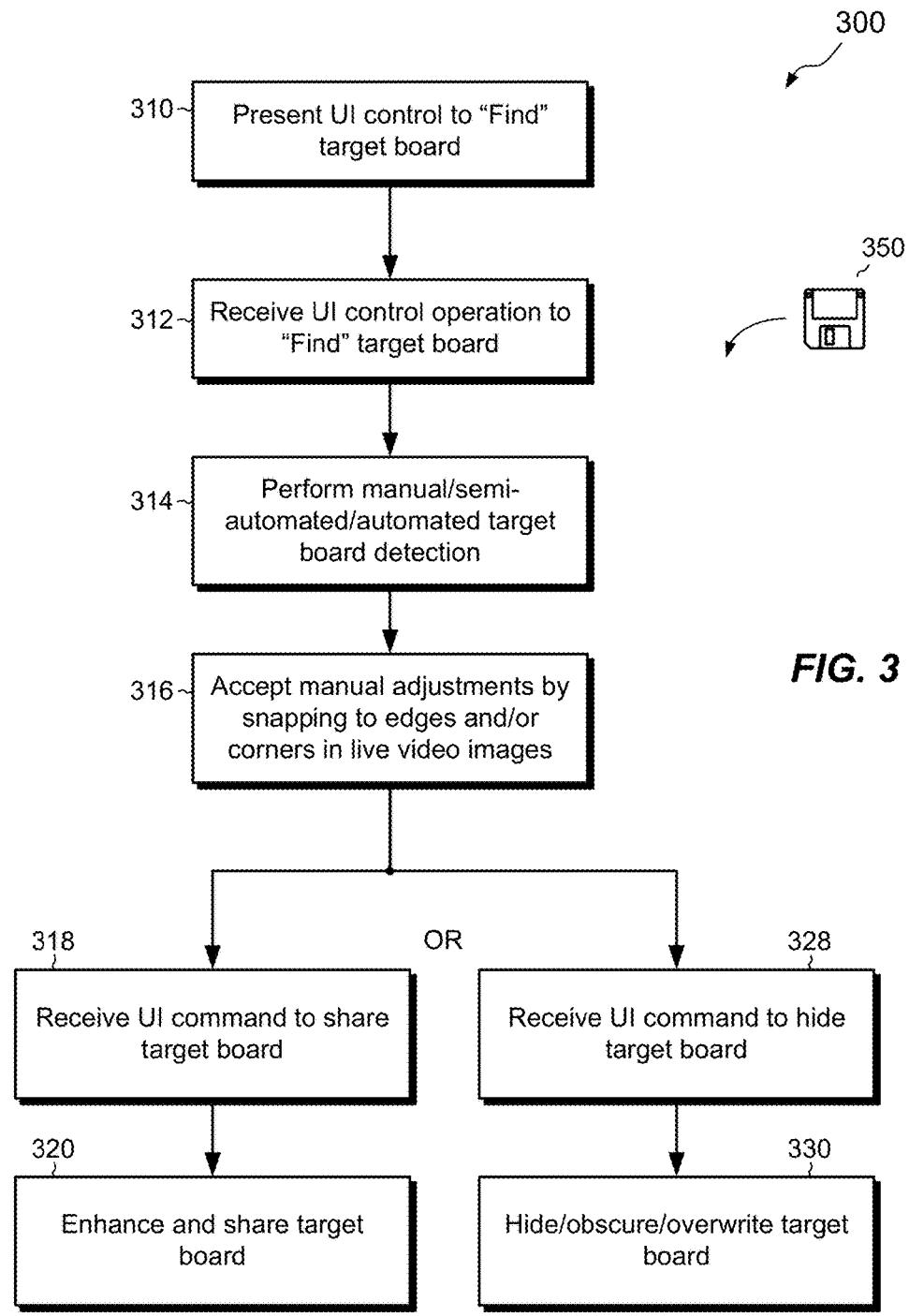
FIG. 3 is a flowchart showing an example process for identifying a physical target board in the field of view of a webcam and for either sharing or hiding the physical target board.

FIG. 3 shows an example process 300 for discovering a physical target board 110 and for either sharing the physical target board with other conference participants or hiding the physical target board from other conference participants. The process 300 may be carried out, for example, by the computing machine 114(1), or by any of the computing machines 114, e.g., by executing instructions of the conferencing client 232 stored in the memory 230 by the set of processors 220.

At 310, the conferencing client 232 presents a UI (user interface) control to "Find" a physical target board. The UI control may be a button or other control provided on a graphical user interface (GUI) displayed by the conferencing client 232 on the display 216 (FIG. 2). The presenter 112(1) may operate the UI control, causing the conferencing client 232 to receive the "Find" instruction (step 312).

At 314, the conferencing client 232 performs physical target board detection, using manual, semi-automated, or fully automated techniques.

At 316, and assuming manual or semi-automated techniques are used, the conferencing client 232 accepts user input to refine target board detection. Actions may include allowing the presenter 112(1) to drag lines and/or corners surrounding an initially identified candidate region. Dragged lines and/or corners may snap to other lines and corners in the image as the presenter moves them. At the conclusion of step 316, the physical target board 110 has been outlined in the live video from the webcam 116. From this point, operation may proceed down a first path, identified with steps 318 and 320, or down a second path, identified with steps 328 and 330.

If operation proceeds down the first path, the UI receives a command to share the physical target board (step 318). In response to receiving this command, the conferencing client 232 enhances the physical target board 110 and shares the enhanced images of the physical target board 110 with other conference participants (step 320).

If operation proceeds down the second path, the UI receives a command to hide the physical target board 110. In response to receiving this command, the conferencing client 232 hides, obscures, or overwrites the physical target board 110 (step 330), so that its contents cannot be viewed by other participants.

Figure 4A:
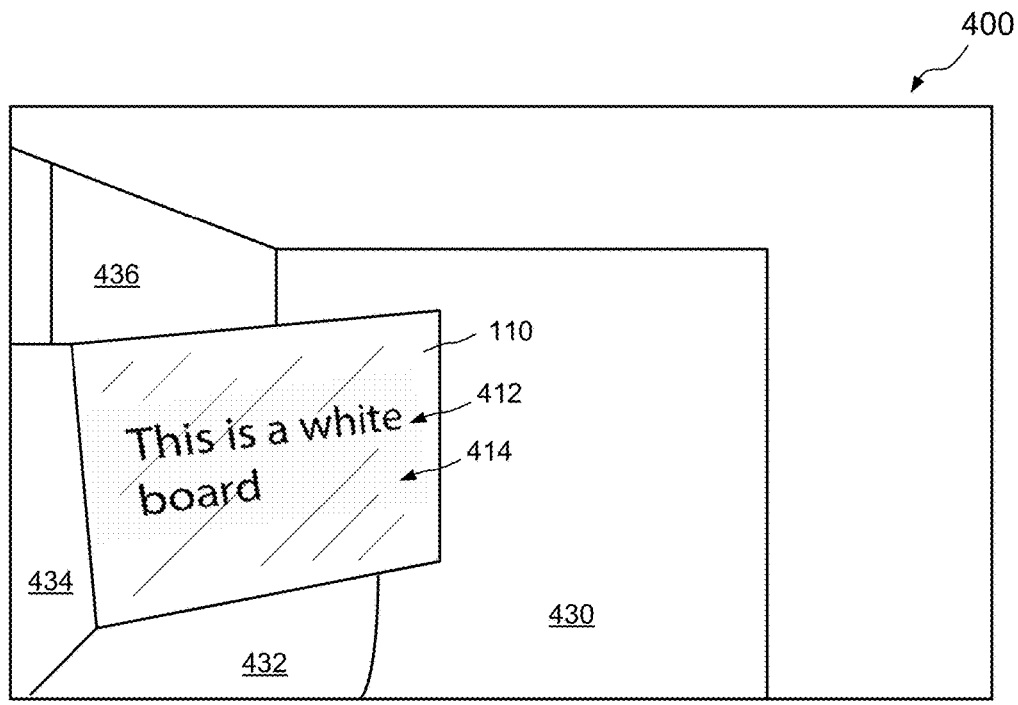
FIGS. 4A-4C are example screen shots of displayed images before physical target board enhancement (FIG. 4A), after physical target board enhancement (FIG. 4B), and after enhancement when a presenter blocks a portion of the physical target board (FIG. 4C)
Figure 4B:
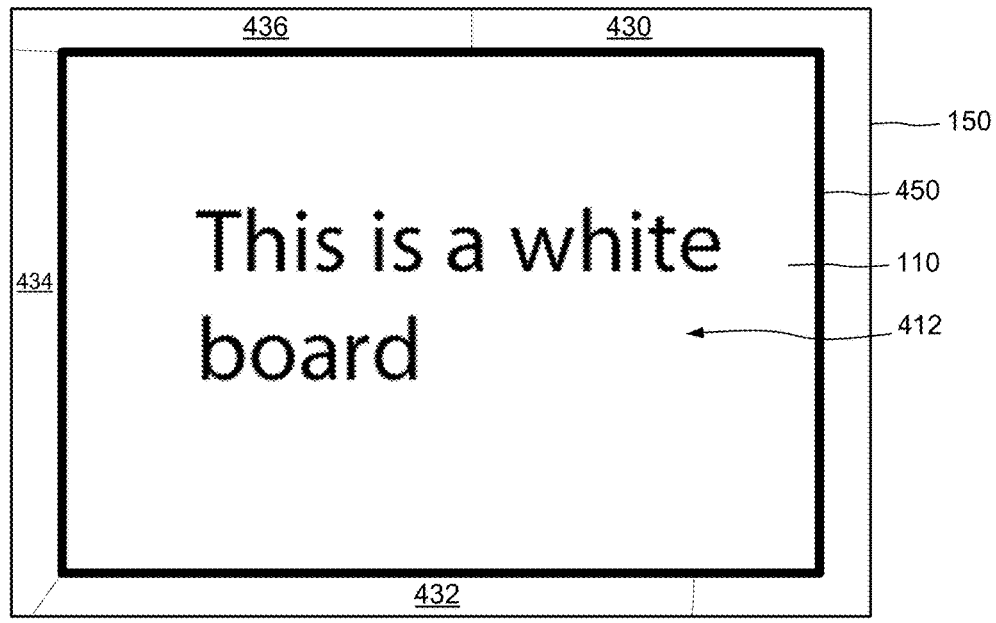
Figure 4C:
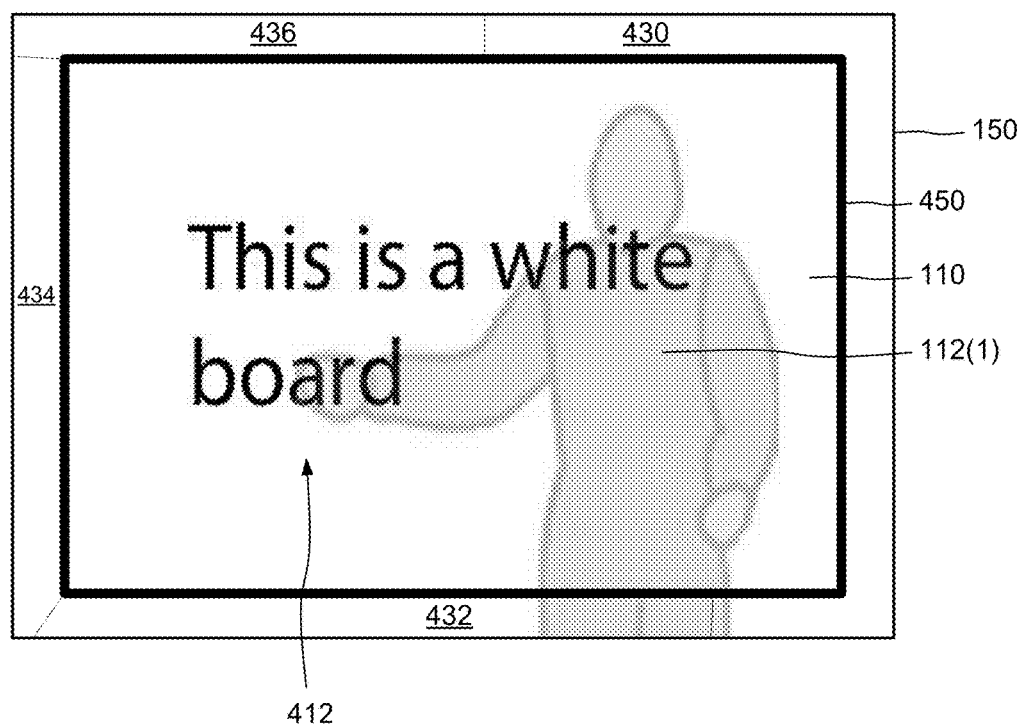

FIGS. 4A-4C show examples of video that the conferencing client 232 may display during an electronic conference.

FIG. 4A shows an example of captured video 400 acquired by the webcam 116(1). Here, it is seen that the captured video 400 includes the entire field of view of the webcam 116(1), which depicts the physical target board 110, e.g., a whiteboard, as well as surrounding objects, such as a desktop 432, a lower wall panel 434, an upper wall panel 436, and a back panel 430, e.g., of an office cubicle. The physical target board 110 has markings 412 written thereon, e.g., "This is a white board," and may have other visible features, such as surface coloration, reflections, and diffuse blotches of color, which together are represented by background 414. It can be seen that the physical target board 110 is oriented at an angle within the field of view of the webcam 116(1) and with its left side closer to the webcam 116(1) than its right side.

If the presenter 112(1) operates the UI command to "Find" a physical target board, the conferencing client 232 may allow the presenter 112(1) to identify the physical target board 110 within the field of view of the webcam 116(1), or it may search for target board candidates automatically or semi-automatically. For example, the conferencing client 232 may identify a set of quadrangles in the field of view of the webcam 116(1). Here, the set of identified quadrangles may include a first quadrangle outlining the physical target board 110, as well as a second quadrangle outlining the portion of the upper side panel 436, visible above the physical target board 110. The conferencing client 232 may then select the quadrangle, from the identified set of quadrangles, that most closely matches a predetermined set of characteristics of physical target boards (see "Additional Information" below for more details about target board selection). The conferencing client 232 may then draw an outline around the best candidate quadrangle. In an example, the outline has edges and corners that the presenter 112(1) can drag to adjust the selection. Once the outline surrounds the image of the physical target board 110, the user may operate a UI command to accept a selection and to treat the selected shape as a physical target board. The conferencing client 232 may then proceed to perform an image enhancement on the physical target board 110.

FIG. 4B shows an example result of image enhancement. Here, the physical target board 110 has been magnified to near full screen and has been centered in a display window of output video 150. The conferencing client 232 has identified edges of the physical target board 110 and has superimposed a distinct border 450 that follows the edges and accentuates the physical target board 110. In this case, the border 450 completely surrounds the physical target board 110 and has a distinct color.

Notably, the view of the physical target board 110 in FIG. 4B appears face-on, while the view from FIG. 4A is seen at an angle and in perspective. To render the view of the physical target board 110 face-on in the output video 150, the conferencing client 232 performs a perspective deskew operation. For example, the conferencing client 232 identifies the four corners of the quadrangle that circumscribes the physical target board 110 and proportionally remaps the video content within the quadrangle to a rectangle. Opposite lines are made parallel and equal-length, and internal content is stretched or compressed to conform to a rectangular shape. The result is a perspective-deskewed rectangle, which includes text 412 and/or other markings with the effects of angles and perspective removed.

The conferencing client 232 may perform additional image enhancements in generating the output video 150. In some examples, the conferencing client 232 may render images of neighboring objects adjacent to the physical target board 110 (e.g., objects 430, 432, 434, and 436) with reduced contrast, color saturation, and/or brightness, to de-emphasize the appearance of neighboring content relative to that of the physical target board 110. In other examples, the conferencing client 232 may render images of the physical target board 110 with increased contrast, color saturation, and/or brightness, to emphasize the appearance of the physical target board 110 relative to neighboring objects. In further examples, the conferencing client 232 may both emphasize physical target board content and de-emphasize neighboring content. In still further examples, the conferencing client 232 may show no neighboring content surrounding the physical target board 110, such that the physical target board 110 is shown alone and full screen.

The conferencing client 232 may perform yet further image enhancements on images of the physical target board 110. For example, the conferencing client 232 may identify the above-described background 414, which has variations in color and brightness, e.g., due to surface coloration, reflections, and diffuse blotches, for example. In some examples, the conferencing client 232 identifies the background 414 and alters the background 414 to have uniform color and brightness. For example, the conferencing client 232 applies an assumption that markings are thin features that have high contrast relative to the background 414. The conferencing client 232 applies this assumption to identify all markings on the physical target board 110 and to identify the background 414 as any content within the boundaries of the physical target board 110 that are not markings. In an example, the conferencing client 232 generates a mask to cover the markings and remaps all pixels in the background 414 to solid white. This operation helps the markings 412 to further stand out relative to the background 414, and thus to be more legibly seen when viewed by conference participants. Further enhancements may include boosting the contrast and/or color saturation of markings. Rather than rendering background pixels as solid white, the conferencing client 232 may alternatively render them as some other color, or as some predetermined pattern or texture.

FIG. 4C is similar to FIG. 4B, except that here it is seen that the presenter 112(1) has moved between the webcam 116(1) and the physical target board 110, such that the presenter 112(1) blocks a portion of the physical target board 110 and some of the markings 412 written thereon. Here, the conferencing client 232 has blended live image content from the webcam 116(1) with image content from the board model 234 to produce a superimposed image that shows both the presenter 112(1) and the markings 412. In an example, the output video 150 includes a pixel-wise, weighted sum of live video content with corresponding content of the board model 234. The conferencing client 232 may tune the weighting of the weighted sum to achieve any desired effect, with a 3:1 ratio of board model to live video yielding good results.

With the arrangement shown, the output video 150 shows the presenter 112(1) in real time, thus capturing the presenter's movements, gestures, and expressions, which help to provide context for the presentation. If the presenter 112(1) writes on the board 110 or erases, the conferencing client 232 captures the changes once the presenter 112(1) moves out of the way and reveals the new markings and/or erasures to the webcam 116(1). The conferencing client 232 then adds the new markings and/or erasures to the board model 234, such that they may continue to be shown even if the presenter 112(1) later moves in front of them.

Figure 5:
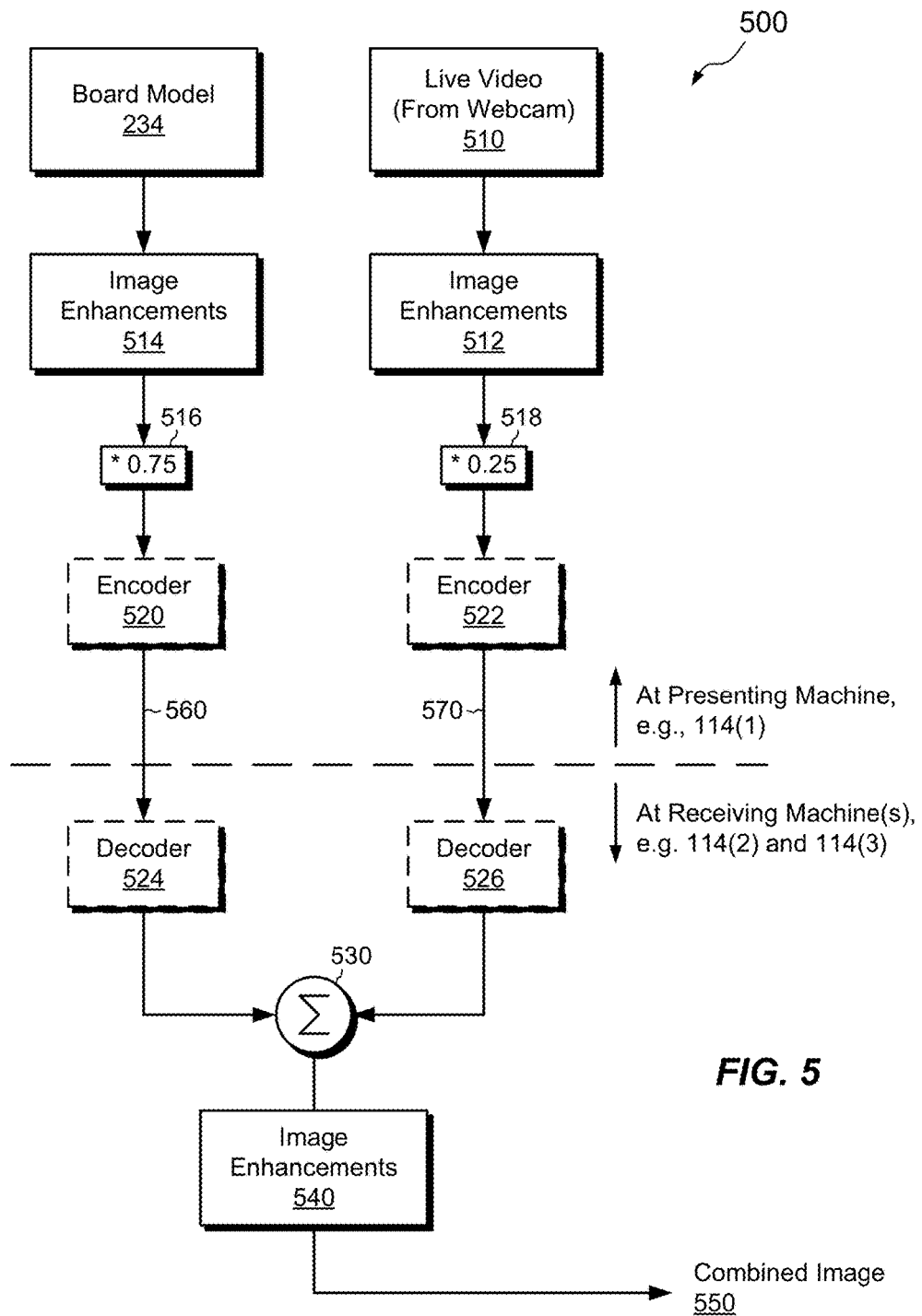
FIG. 5 is a flowchart showing an example process for generating combined video showing both the physical target board and any occluding content blocking the physical target board.

FIG. 5 shows an example process 500 for superimposing content from the board model 234 with live video content 510 acquired by the webcam 116(1). Here, a summer 530 generates a weighted sum of content from the board model 234 with live video content 510 in a 3:1 ratio, as established by weighting factors 516 and 518, respectively. Image enhancements 540, e.g., those described above, may act on output from the summer 530 to produce combined video 550, which may be magnified, bordered, and/or deskewed, and in which the background 414 may be replaced with pixels of uniform color and brightness. In some examples, the process 500 performs image enhancements 512 and 514 for the board model 234 and live video 510 individually, i.e., before the summer 530 combines them, either in place of performing image enhancements 540 or in addition thereto. In an example, the summer 530 performs the summing operation on a per-pixel basis, such that each pixel value in the board model 234 is summed with a pixel value at a corresponding spatial location in the live video 510, making the combined video 550 from the two sources appear superimposed and overlaid. The presenter machine 114(1) may then provide the combined video 550 as the output video 150 (FIG. 1), which the machine 114(1) sends to the other computing machines 114(2) and 114(3).

As described in connection with FIG. 1, the presenter machine 114(1) may alternatively provide the output in two video streams, i.e., a first video stream conveying physical target board content and a second video stream conveying live video content. In an example, the process 500 employs encoder 520 to encode the board model 234 and thus to generate the first video stream (560). Similarly, the process 500 employs encoder 522 to encode the live video 510 and thus to generate the second video stream (570). In this scenario, the presenter machine 114(1) provides the output video 150 in the form of the first video stream 560 and the second video stream 570. The computing machine 114(1) may send the first video stream 560 and the second video stream 570 over the network 130 to receiving machines 114(2) and 114(3), which each employ decoders 524 and 526 to decode the respective video streams. Each of the receiving machines 114(2) and 114(3) then performs summation 530 and image enhancements 540 (assuming any more are desired) to generate the combined video 550. Users of the receiving machines 114(2) and 114(3) can then view the combined video 550.

Figure 6:
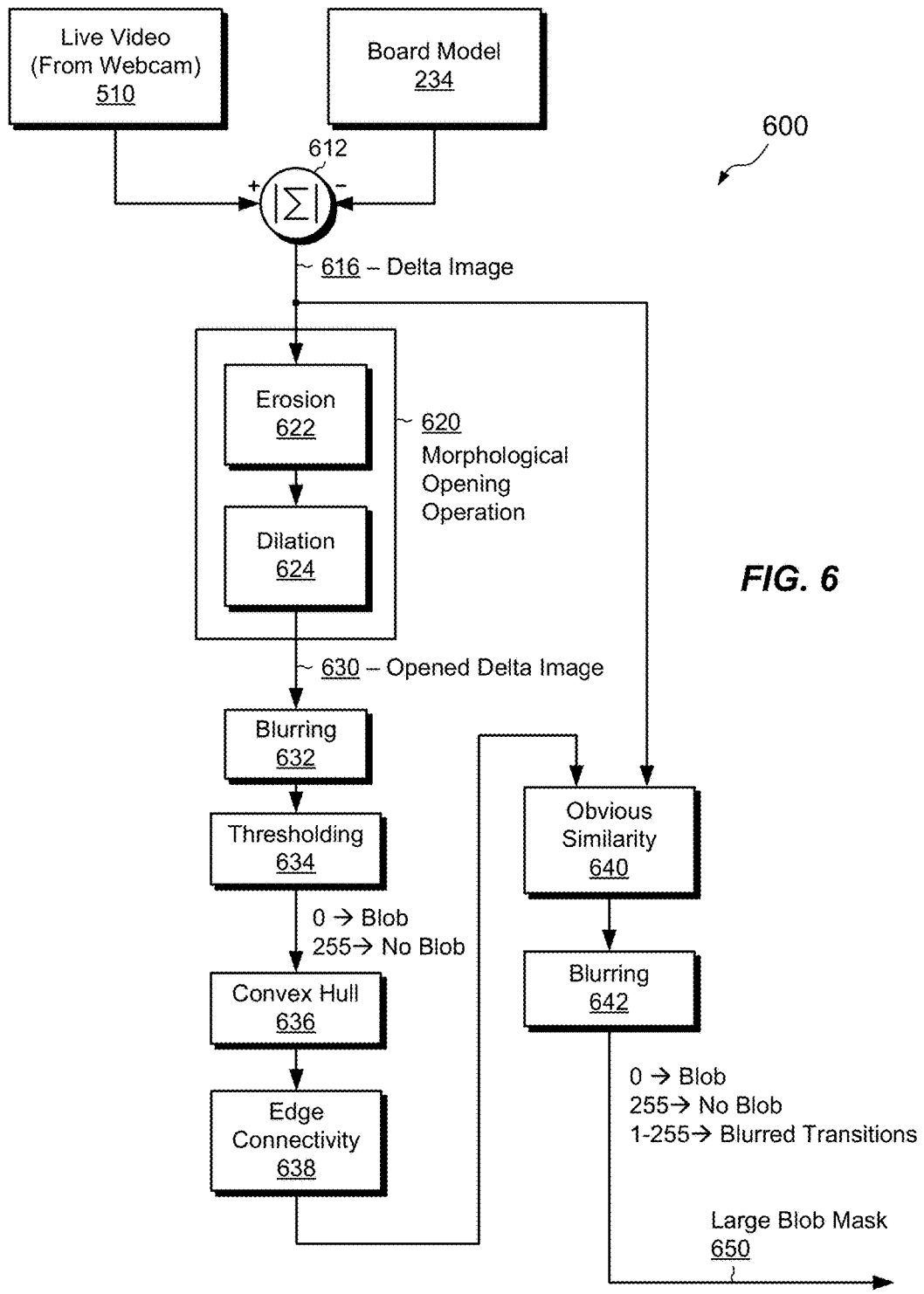
FIG. 6 is a flowchart showing an example process for generating a large blob mask used to identify occluding objects.

FIG. 6 shows an example process 600 for generating a large blob mask 650. The large blob mask 650 identifies thick objects in the live video 510 and thus provides a useful way to distinguish occluding objects from markings and erasures. Distinguishing between occluding objects and markings or erasures helps to ensure that new markings and erasures trigger updates to the board model 234 whereas occluding objects do not. In an example, the conferencing client 232 applies geometrical assumptions about markings, erasures, and occluding objects. For instance, the process 600 assumes that markings on the physical target board 110 are generally relatively thin compared with occluding objects, which tend to be relatively thick.

The process 600 begins by taking an absolute difference 612 between the live video 510 and the board model 234 to generate a delta image 616. For instance, for each pixel location (i.e., spatial coordinate) in the board model 234, a pixel is created in the delta image 616. The pixel has a value that equals the absolute value of the difference between a pixel value at that same location in the live video 510 and a pixel value at that same location in the board model 234. The delta image 616 generally includes pixels having small or zero values for areas of the physical target board 110 that do not change, but may include pixels having larger values for new markings, new erasures, and any occluding objects.

To avoid masking board model updates reflecting newly added markings or erasures, it is desirable to exclude such markings or erasures from the large blob mask 650. The process 600 effects exclusion of markings and erasures from the large blob mask 650 by performing a morphological opening operation 620. The opening operation 620 includes an erosion operation 622 and a dilation operation 624. The erosion operation 616 may be carried out, for example, by replacing each pixel in the delta image 616 with the minimum of its neighbors, thus eroding away pixels corresponding to thin markings and erasures. The dilation operation 624 may be carried out, for example, by replacing each pixel in the eroded image with the maximum of its neighbors, thereby restoring nearly original dimensions to large objects whose edges have been eroded back. The output of the morphological opening operation 620 is the opened delta image 630, which is similar to the delta image 616 but excludes thin markings and erasures. The opened delta image 630 may thus be used to identify large objects that are not part of the board model 234, which generally correspond to occluding objects.

In some examples, the process 600 may stop after generating the opened delta image 630, such that the opened delta image 630 provides the large blob mask 650. Preferably, however, the process 600 performs additional operations on the opened delta image 630, or on further processed versions thereof, with the aim of improving the quality and clarity of updates made to the board model 234. These further operations may be carried out individually or in various combinations.

For example, the process 600 may further include a blurring operation 632, which has the effect of blurring edge transitions of features remaining in the opened delta image 630. A binary thresholding operation 634 may be performed on the result of the blurring operation 632. In an example, the binary thresholding operation 634 establishes a threshold against which pixel values of the opened delta image 630 are compared. If the value of a pixel in the opened delta image 630 exceeds the threshold, the operation 634 assigns the pixel the value of 0, to signal the presence of an occluding object (i.e., a "blob"). However, if the value of the pixel falls below the threshold, the operation 634 assigns the pixel a value of full scale, e.g., 255, thus indicating "no blob." In an example, the process 600 performs this comparison for each pixel in the opened delta image 630. The output of the thresholding operation 634 is thus an image of full-resolution pixels, where each pixel has only one of two possible values, 0 or 255.

In an example, the combination of blurring 632 with thresholding 634 has the effect of smoothing outlines of features included in the opened delta image 630, which might otherwise appear jagged and/or noisy. This blurring/thresholding combination yields a more pleasing effect in the output video 150, as boundaries between live and board model content are made to appear smooth and more seamless.

Binary thresholding also helps to make the large blob mask 650 insensitive to most reflections. Many physical target boards (e.g., whiteboards) are glossy surfaces that act as weak mirrors. Sometimes, the reflections produced by whiteboards can change (e.g., an object reflected by the target board can move, a computer monitor reflected by the target board can update its screen content, etc.). It would generally be undesirable for such changes to remain in the large blob mask 650, as the effect could be to mask out legitimate updates to the board model 234 in the regions of the changed reflections. Appropriately setting the value of the above-described threshold can help to keep changes arising from most reflections out of the large blob mask 650, such that reflections and changes in reflected regions are allowed to register changes in the board model 234.

The process 600 may further include a convex hull operation 636. The convex hull operation 636 circumscribes each occluding object with a fully convex polygon, i.e., a polygon for which none of the vertices points toward the inside of the polygon. In an example, when performing the convex hull operation 636, pixel values within the polygon, which are not already 0, are changed to 0, such that all of the pixels inside of the polygon are uniformly made part of the occluding object. This is the case regardless of whether the occluding object includes gaps or holes through which the webcam 116(1) can capture fleeting images of the physical target board 110. Avoiding updates to the board model 234 for gaps and holes prevents the board model 234 from appearing patchy or fragmented.

The convex hull operation 636 may also prevent board updates from occurring when an occluding object includes a region that resembles the physical target board 110. For example, the presenter 112(1) may wear a tee shirt with a white image that resembles part of a white board. Excluding this white image via the convex hull operation 636 prevents the board model 234 from improperly registering erasures inside the region of the white image.

The process 600 may further include an edge connectivity operation 638. The edge connectivity operation 638 may be performed regardless of whether the above-described convex hull operation 636 is performed. In an example, the edge connectivity operation 638 inspects each feature in the opened delta image 630 (or further-processed version thereof) and tests whether the feature intersects an outside edge of the physical target board 110. The edge connectivity operation 638 works on the principle that features intersecting an edge of the physical target board 110 are likely to be part of the presenter 112(1) and thus should remain part of the large blob mask 650 and kept out of the board model 234. Conversely, any feature that does not intersect an edge of the physical target board 110 is likely to represent legitimate content of the physical target board 110 and should thus be excluded from the large blob mask 234 and allowed to update the board model 234.

An illustrative example of this operation can be seen if the presenter 112(1) places an adhesive-backed piece of paper (e.g., a Post-It® note) on the physical target board 110. As long as the presenter 112(1), whose body crosses at least one edge of the physical target board 110, is holding the piece of paper, the feature as a whole intersects an edge of the physical target board 110, such that the edge connectivity operation 238 incorporates the paper within the large blob mask 650. A result of this inclusion is that the paper remains excluded from the board model 234. The pixels in the board model 234 that correspond to the paper remain unchanged, and the output video 150 displays any content behind the paper. If the presenter 112(1) then sticks the paper to the physical target board 110 and withdraws his or her hand, the paper loses its connection to any edge of the physical target board 110. As a result, the edge connectivity operation 238 removes the pixels corresponding to the paper from the large blob mask 650, with the result that the paper becomes included in the board model 234 on the next update.

The process 600 may further include an obvious similarity operation 640. The obvious similarity operation 640 removes from the large blob mask 650 (or any precursor thereof) any pixels whose live values differ only slightly from the respective values in the board model 234. These embodiments provide an optimization to make updates to the board model 234 faster and more responsive. They also mitigate cases in which soft shadows, e.g., cast by the presenter's arm, cause large regions of the target board to be filtered out simply on account of their proximity to actual occluding objects. The process 600 may carry out this optimization as part of the blurring/thresholding operations (632 and 634), described above, or as a later act (as shown).

The process 600 may further include another blurring operation 642. The blurring operation 642 may be performed regardless of whether the above-described convex hull operation 636 and/or edge connectivity operation 638 are performed. The blurring operation 642 softens edges in the opened delta image 630, or processed version thereof. In an example, the input to the blurring operation 642 is an image having pixel values that are either 0 or 255. The output of the blurring operation is similar, except that pixels near a transition between 0 and 255 assume intermediate values, i.e., between 0 and 255, to provide gradual transitions instead of sharp edges. As will become apparent, this blurring operation 642 allows for smoother application of the large blob mask 650 when updating the board model 234.

Figure 7:
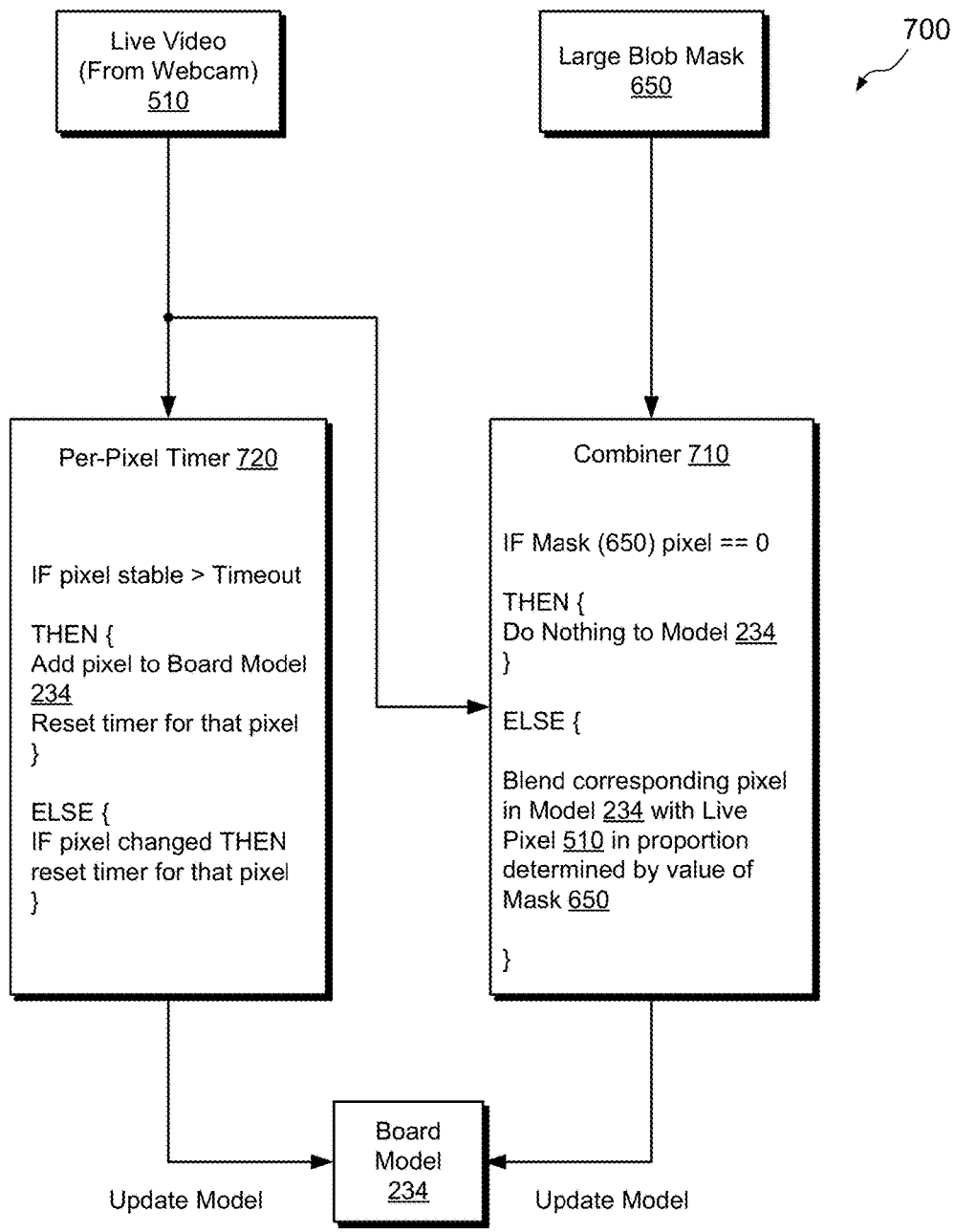
FIG. 7 is a flowchart of an example process for updating a board model to reflect changes over time in physical target board content.

FIG. 7 shows an example process 700 for updating the board model 234 based on the large blob mask 650, described above. Here, a combiner 710 receives, as input, the large blob mask 650 and live video 510, e.g., from the webcam 116(1). The combiner 710 generates, as output, updates to the board model 234. For example, the updates are written to designated pixel locations in the board model 234, to blend new pixel values with existing ones.

The combiner 710 applies logic as illustrated in the figure. For example, if the pixel value at a designated location (spatial coordinate) in the large blob mask 650 is 0 (indicating a blob), then no update is performed to the board model 234 at that pixel location and the board model 234 remains unchanged. However, if the pixel value at a designated location in the large blob mask 650 is not equal to zero, then the combiner 710 blends the pixel value at the designated location in the board model 234 with the pixel value at the same location in the live video 510. In an example, the proportions for blending depend on the value of the large blob mask 650. For example, if the value of the large blob masks 650 at a designated pixel location is "N," where N varies between 1 and 255, the combiner 710 may blend pixel values as follows:

New Pixel Value=(Live*N+Model*(255−N))/255, where "Live" is the pixel value of the live video 510 and "Model" is the pixel value of the board model 234, both at the designated location.

The process 700 may also update the board model 234 based on a per-pixel timer 720. According to this example, each pixel location in the live video 510 has an associated timer. The timer counts down from an initial timeout value to 0. The initial timeout value may be set to a few seconds, such as 10 seconds. If the live pixel in question remains substantially constant for the entire countdown, the live pixel is assumed to be part of the physical target board 110 and the process 700 updates the board model 234 to include the value of the live pixel. If, however, the pixel in the live video 510 changes, the timer for that pixel is reset and the countdown begins again. In an example, the per-pixel timer 720 operates continually for each pixel location in the board model 234.

It should be understood that pixel values may vary slightly due to noise. Thus, for example, the per-pixel timer 720 may establish a narrow error band around each pixel location's initial value. If any pixel value falls outside the error band, the timer for that pixel's location is reset and the countdown starts again.

Figure 8:
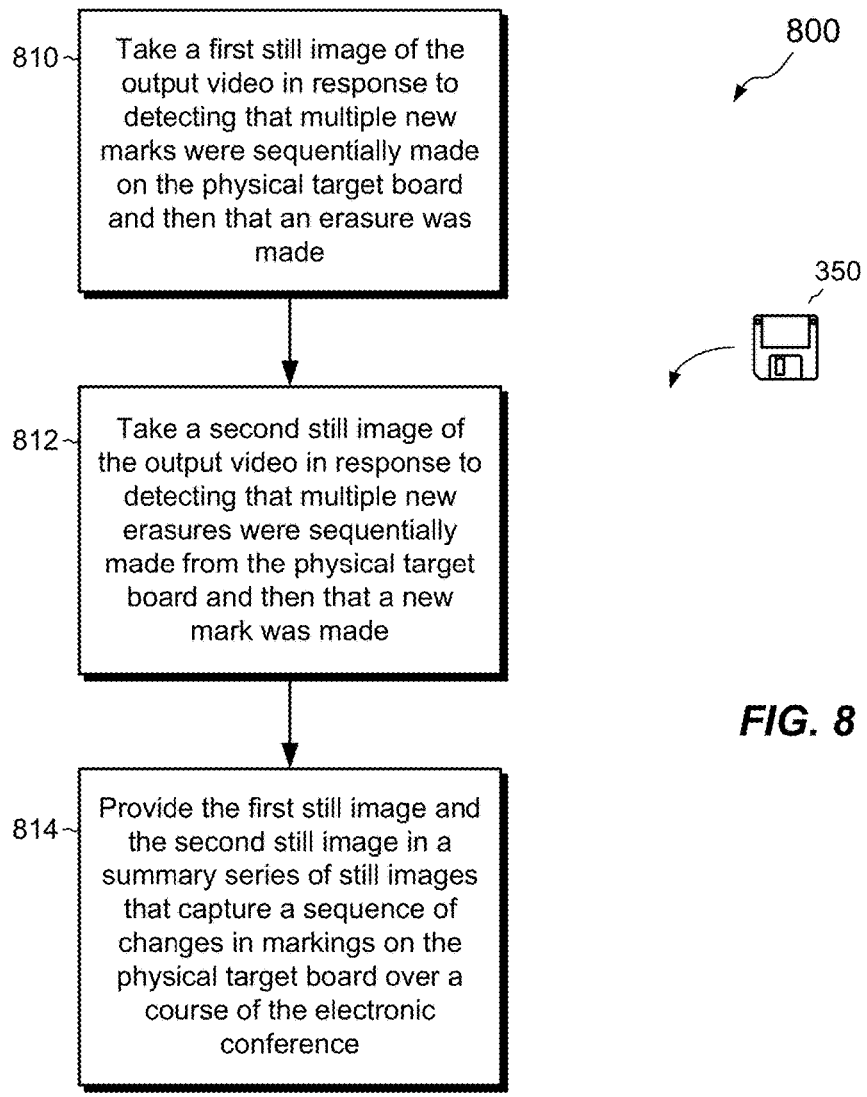
FIG. 8 is a flowchart showing an example process for generating a summary series of still images that capture a sequence of changes in markings on the physical target board over the course of an electronic conference.

FIG. 8 shows an example process 800 for generating a summary series of still images that capture a sequence of changes in markings made on the physical target board 110 over the course of an electronic conference. The process 800 may be carried out, for example, by the conferencing client 232 running on a computing machine 114.

In this example, it is desirable to capture a series of still images of the physical target board 110 that record changes in board content. It is not necessary or desirable that a still image be recorded for each and every mark or erasure made on the physical target board 110. Rather, what is desired is to obtain a still image after each sequence of multiple added marks and after each sequence of multiple erasures. Such sequences may indicate transitions in topics presented, such that recording a still image for each sequence does a better job of following the flow of a presentation than would be accomplished by taking still images at regular intervals or randomly.

The process 800 identifies marks and erasures made on the physical target board 110. In an example, the conferencing client 232 maintains two background models, a first model for a previous frame of video and a second model for a current frame of video. The conferencing client 232 identifies differences between the two models. If a region appears darker in the second image than it did in the first, the conferencing client 232 may characterize a change between the frames as a new marking, or "inking" Conversely, if a region appears lighter in the second image than it did in the first, the conferencing client 232 may characterize the change as an erasure.

In an example, the conferencing client 232 takes still images for the summary only after detecting a shift from a sequence of inking operations to an erasure, or after detecting a shift from a sequence of erasures to an inking operation. Once a shift is detected, from inking to erasure or vice-versa, the conferencing client 232 records a still image of the physical target board just prior to the shift. For example, if a sequence of changes consists of three consecutive inkings followed by one erasure, the conferencing client 232 records a still image of the board's state after the third inking but before the erasure. Likewise, if a sequence of changes consists of three consecutive erasures followed by one inking, the conferencing client 232 records a still image of the board's state after the third erasure but before the subsequent inking.

In some examples, no additional still images are acquired as long as the changes detected are either all inking or all erasure. In other examples, the conferencing client 232 employs a timer. If no shift occurs between inking and erasure within a specified timeout period, the conferencing client 232 takes a new still image of the physical target board, regardless of the nature of changes to the physical target board 110.

In some examples, the conferencing client 232 may take a new still image in response to detecting that both new ink and new erasure appear in a new frame. For example, the presenter 112(1) may temporarily block the physical target board 110 while making one or more inkings and erasures. When the presenter 112(1) moves out of way to reveal the new board content, the conferencing client 232 detects the presence of both new ink and new erasure and takes an additional still image of the new frame. The additional still image may then be provided along with the other still images in the summary.

Turning now to the particular acts of the process 800, it is seen that a first still image is taken of the output video 150 at step 810. The first still image is taken in response to detecting that multiple new marks were sequentially made on the physical target board and then that an erasure was made. For example, as long as new marks are being made, with no intervening erasures, no still image is recorded for the summary. Only after an erasure is made following the addition of multiple new marks is the first still image recorded. In an example, the image is taken from one frame prior to the detection of the erasure, and thus represents the state of the physical target board 110 after the last mark was made in the sequence but prior to the erasure.

At 812, a second still image is taken of the output video. The second still image is taken in response to detecting that multiple new erasures were sequentially made on the physical target board and then that a new mark was made. For example, as long as new erasures are being made, with no intervening inkings, no still image is recorded for the summary. Only after a mark is made following the multiple erasures is the second still image recorded. In an example, the image is taken from one frame prior to the detection of the newly added mark, and thus represents the state of the physical target board 110 after the last erasure was made in the sequence but prior to the new mark being added.

At 814, the first still image and the second still image are provided in a summary series of still images that capture a sequence of changes in markings on the physical target board over a course of the electronic conference. The summary series may include any number of still images, each representing a sequence of related changes in the content of the physical target board 110.

Figure 9:
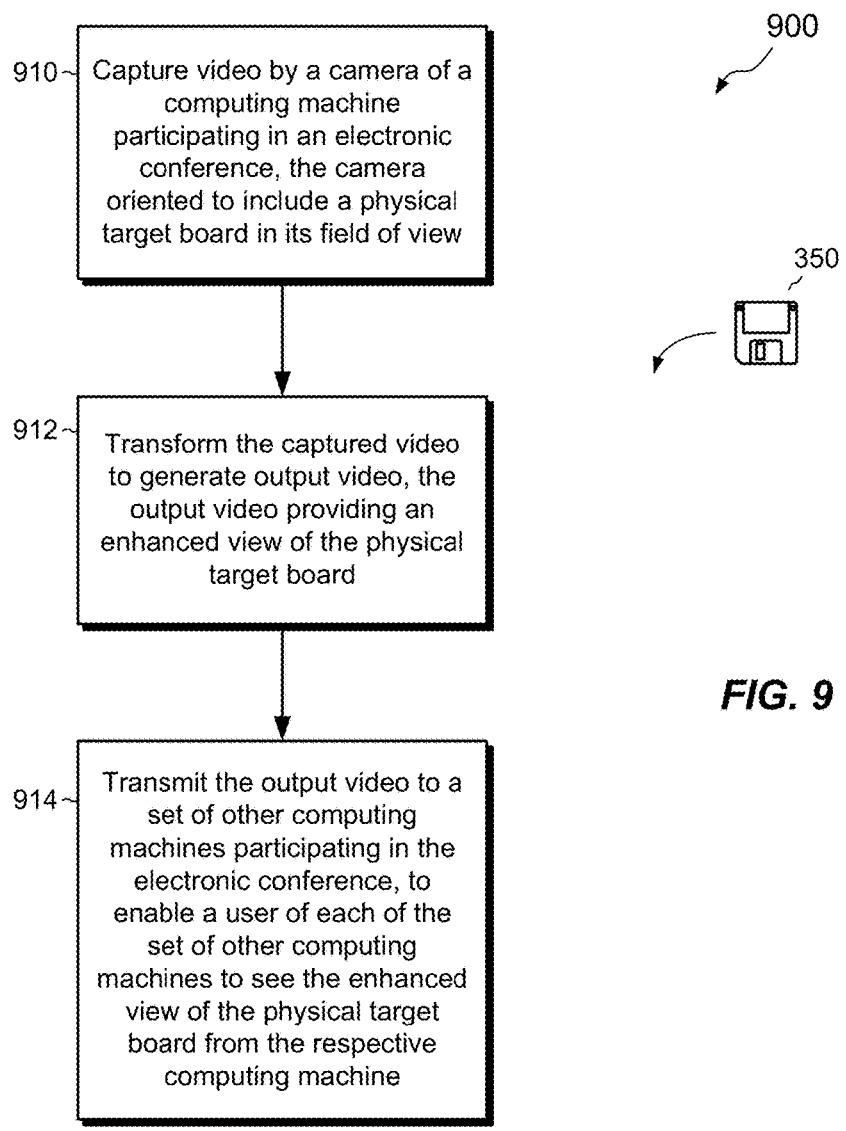
FIG. 9 is a flowchart showing an example process for sharing physical target boards in electronic conferences.

FIG. 9 shows an example process 900 for sharing target boards in electronic conferences, and provides a summary of some of the operations described above. In an example, the process 900 is carried out by the conferencing client 232 running on the computing machine 114(1).

At 910, video is captured by a camera of a computing machine participating in an electronic conference. The camera is oriented to include a physical target board in its field of view. For example, as shown in FIG. 4A, video 400 is captured by the webcam 116(1) of the computing machine 114(1). The webcam 116(1) includes the physical target board 110 (e.g., a whiteboard), in its field of view.

At 912, the captured video is transformed to generate output video. The output video provides an enhanced view of the physical target board. For example, the captured video 400 (FIG. 4A) is transformed into the output video 150 (FIGS. 4B and 4C). The output video 150 is enhanced in the various ways described, which may include, for example, magnifying, deskewing, and bordering the physical target board 110, as well as performing image processing to make the physical target board 110 more prominent in the output video 150.

At 914, the output video is transmitted to a set of other computing machines participating in the electronic conference, to enable a user of each of the set of other computing machines to see the enhanced view of the physical target board from the respective computing machine. For example, the conferencing client 232 on the computing machine 114 sends the output video 150, either in a peer-to-peer manner or via the conferencing server 120, to the computing machines 114(2) and 114(3), where respective users 112(2) and 112(3) may view the enhanced images of the physical target board 110.

An improved technique has been described for sharing a physical target board 110 over an electronic conference. The technique includes transforming live video 400 from a webcam 116(1) into output video 150 that provides an enhanced view of the physical target board 110. The output video 150 is shared with one or more computing machines (114(2) and 114(3)) of conference participants (112(2) and 112(3)) to enable such participants to see the enhanced view of the physical target board 110 in real time. The conference participants can thus enjoy enhanced images of the physical board and its content, which would otherwise be difficult or impossible to see.

Having described certain embodiments, numerous alternative embodiments or variations can be made. For example, although the techniques hereof have been described in connection with electronic conferencing, it should be understood that the invention may be applied in any video context. For example, the techniques hereof may be employed for recording physical target board presentations for later retrieval, regardless of whether the presentations were part of an electronic conference. In some examples, video recorded using the disclosed techniques may be stored in a set of storage media (e.g., one or more disk drives, optical drives, solid state drives, and the like) and/or posted on a computer network (e.g., online) for on-demand retrieval. Thus, for example, the techniques disclosed herein may be used for off-line applications as well as for conferencing applications. The techniques disclosed may further be applied in video transmission, such as in over-the-air, cable, and/or satellite television broadcasting.

Also, although the techniques herein have been described in connection with physical target boards used as writing surfaces, nothing prevents the disclosed techniques from being used with other types of boards, such as physical game boards. For example, a conference participant can play a game, such as chess, with another conference participant, with a webcam positioned to capture a clear image of the chessboard. In this example, a board model may represent the state of the chessboard and may be updated as indicated above to reflect movements of physical chess pieces, with all conference participants able to visualize the chessboard completely, even when the presenter's hand or body blocks the webcam's view.

Also, although the image enhancements described above relate to processing images once the webcam 116(1) has acquired them, this is merely an example. For instance, additional enhancements may involve the conferencing client 232 controlling the webcam 116(1) to force characteristics, such as focus, exposure, and/or signal processing performed by the webcam 116(1) itself and/or by its device driver. For example, the conferencing client 232 controls the webcam 116(1) to set its optical focus on the physical target board 110 and to subsequently hold that focus, even if other objects are later interposed. Optical focus of the webcam 116(1) can thus be trained on the physical target board 110 and kept there throughout the conference. In some examples, the participant can operate one of the UI controls to select an area within the pictured video as a focusing target. In response to the participant operating the UI control, the computing machine 114 causes the webcam 116 to focus on the identified target and to hold its focus for the duration of the conference or until some other UI change is made. Similar operations may be conducted for exposure, gain, and so forth, with a desired characteristic established and held for optimal and consistent viewing.

Although it has been described that the thickness of feature in a delta image 616 are used to identify occluding objects, this is not the only possible option. Alternatively, for example, the conferencing client 232 may acquire and employ depth information. For instance, the webcam 216 may include a depth sensor (e.g., such is currently found in the Xbox Kinect or similar device), or the webcam 116 may be used in connection with another device that includes a depth sensor. In an example, each pixel acquired by the webcam has an associated depth value. During an initialization process, the conferencing client 232 may direct the participant to acquire an unobstructed view of the target board, from which a depth value is determined, where the depth value corresponds to the distance between the webcam and the physical target board. Subsequently, as the webcam 116(1) acquires live images, the conferencing client 232 examines the depth value of each live pixel within the boundaries of the physical target board 110. If the depth value indicates a depth approximately equal to the depth value acquired during initialization, then the conferencing client 232 may conclude that the live pixel shows target board content rather than occluding content. The conferencing client 232 may then update the board model 234 to reflect the live pixel's image value. However, if the depth value associated with the live pixel indicates a depth less than the depth value acquired during initialization, the conferencing client 232 may conclude that the live pixel shows occluding content rather than target board content. The conferencing client 232 may then add the pixel to the large blob mask 650, to prevent the pixel from updating the board model 234. More information about using depth values in electronic conferences may be found in U.S. application Ser. No. 13/913,748, filed Jun. 10, 2013, the contents and teachings of which are incorporated by reference in their entirety, as if set forth explicitly herein.

Further, the output video 150 has been described as including both board model content and live video, e.g., in the form of a first stream 560 and a second stream 570. This is not required, however. Alternatively, the output video 150 may include board model content but no live video. This may be the case even if live video is sent, e.g., in a separate stream, where two streams are combined at receiving machines.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 350 in FIGS. 3, 8, and 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

Additional Information:

Regarding target board discovery, the conferencing client 232 may present a set of user interface (UI) controls to a conference participant, e.g., to the participant 112(1). The UI controls allow the conferencing client 232 to accept manual input from the participant 112(1) to select (e.g., using the pointer 218 or other input device) a physical target board 110 rendered in video images acquired from the webcam 116(1). For example, the UI controls include one or more drawing controls for applying closed shapes around objects displayed in the video images. Once the participant draws or otherwise applies a closed shape, the participant may operate a UI control to select the closed shape as the target board. Once the target board is selected, it may become the subject of further processing and/or sharing or hiding with other conference participants.

In some examples, the drawing controls include capabilities for drawing quadrangles (4-sided polygons) around displayed objects and adjusting the positions and angles of edges and/or corners of drawn quadrangles accurately to encompass the target board. The technique may render quadrangles transparently or translucently with clearly identifiable edges, so as to facilitate their manual placement relative to the video images.

In further examples, the drawing controls include capabilities for moving quadrangles. For example, a participant 112(1) can draw a quadrangle anywhere relative to the live video and then move the quadrangle to a desired position near the image of the target board. The participant may then adjust the moved quadrangle's edges and/or corners accurately to encompass the target board.

Certain examples augment the above-described manual technique of selecting a target board 110 with automated techniques. For example, the conferencing client 232 performs image processing on video images acquired from the webcam 116 to identify strong edges in the images, e.g., through the use of a customized Hough transform. When the participant 112(1) attempts to draw a closed shape around the target board, the conferencing client 232 causes lines drawn by the participant readily to snap to the identified strong edges. In some examples, the conferencing client 232 identifies not only strong edges but also corners and/or quadrangles within the live video images. As the participant 112(1) moves corners and/or quadrangles drawn relative to the video images, the corners and/or quadrangles are caused readily to snap to identified corners and/or quadrangles in the live video. Such automated techniques thus assist the participant in manually selecting physical target boards within displayed video images while minimizing the need for fine adjustments.

The goal of strong edge detection is to detect prominent straight lines within the video frame. For this, we use a custom implementation of the Hough transform. The Hough transform performs edge detection on an image, and then, for every possible line through the image, counts the number of edge pixels that lie on that line. The more edge pixels, the higher the line's score. This process generates straight lines that are then classified as vertical or horizontal, based on a heuristic threshold of the line's angle in the image. Each line that was generated from the Hough transform has a weight, roughly translating to its strength.

In descending order of line's weights, the conferencing client 232 generates quadrangle candidates. A valid candidate is one which has two horizontal lines and two vertical lines, and contains the target pixel. In a greedy fashion, each quadrangle is evaluated for features, and scored immediately, rather than as a batch process after all quadrangles have been generated. Using the greedy algorithm, we can end the search process early (when we see no score improvement for some threshold number of quadrangles) rather than searching through all possibilities.

In some examples, the conferencing client 232 detects physical target boards 110 automatically. For example, a participant 112(1) may operate a UI control to "Find" a target board, whereupon the conferencing client 232 performs image processing on live video images automatically to find the best target board candidate or set of candidates. In some examples, automatic detection of target boards proceeds using a multi-factor approach. Candidates are identified, e.g., based on finding quadrangular (or other) shapes formed from intersecting strong edges, and different factors are computed and scored for each candidate. The conferencing client 232 combines scores for the factors to yield a total score for each candidate, with the highest total score identifying the best candidate. The conferencing client 232 then automatically outlines the best candidate for the physical target board 110 in the video images, e.g., by rendering a distinct outline around the best candidate. The participant 112(1) may then operate the "Select" UI control to confirm the automatic detection. In some examples, the participant 112(1) may operate the "Find" UI control (or some other control) to display other candidates, e.g., successively in descending order of total score, and then operate the "Select" UI control to select the candidate that best encompasses the actual target board 110.

In some examples, the conferencing client 232 computes the above-described total score as a weighted sum of factors, wherein weights that are applied to the different factors are tuned using a machine learning algorithm. In an example, a machine learning classifier is trained to generate suitable weights for the factors by operating on actual video images that include pre-identified target boards. The machine learning classifier may operate to improve automatic target board detection over time by rewarding (increasing the weights of) factors correlated with correct detections of target boards and/or punishing (decreasing the weights of) factors correlated with incorrect detections of target boards. It should be understood that other machine learning techniques may be used and that the embodiments hereof are not limited to any particular machine learning algorithm. For example, a neural network can take in raw images (e.g., with no lines detected ahead of time) and output a four-corner quadrangle description of a target board, without relying on manually decided metrics or explicit quadrangle scoring techniques.

In an example, each quadrangle detected in the live video is assigned a vector of features. In a particular example, twelve features are used: cumulative line strength, color mask fullness, color mask coverage, color mask line strength, mean color (one per RGB channel), standard deviation of the color (one per RGB channel), edge verticality, and minimum angle. The details of each feature follow:

Cumulative Line Strength. This feature is generated by taking the strength of each of the four lines that make up the quadrangle, and dividing it by the maximum possible strength of that quadrangle. For example, a perfect quadrangle would have its entire perimeter "filled" with edge pixels from the Hough transform. For this feature, specifically, we do not consider edge pixels that contribute to the raw Hough lines, but which lie outside the candidate quadrangle's perimeter. By limiting the search to edge data covered by the perimeter, we ensure that the each side's line strength actually contributes to the quadrangle's strength, and is not a result of irrelevant strong line data elsewhere in the frame.

Color mask fullness. For this feature, we generate a "target color mask," which is identical to the Uniformity+Brightness Image generated during the Preparation phase (see below), but with the random points centered specifically around the target pixel within the quadrangle. The fullness feature, then, represents the amount to which the area made up by the quadrangle is covered by pixels in the target color mask. The intuition is that some poor quadrangles will be filtered out because they contain large regions that are not present in the broad, uniform area colored by the target color mask.

Color mask coverage. This feature is similar to color mask fullness, except that it considers how much of the target color mask is left outside of the candidate quadrangle. Higher scoring quadrangles for this feature will contain more of the target color mask within their borders, regardless of empty space within the quadrangle. The intuition is that quadrangles that capture a subsection of the physical target board will have good fullness scores, but should be penalized for missing a large portion of the broad color region generated by the target color mask.

Color mask line strength. Utilizing the first part of the Hough detection process, we perform edge detection on the target color mask. Then, similar to the cumulative line strength feature, we evaluate the quadrangle for how well its perimeter "matches" the generated edge pixels. The intuition is that, sometimes the target color mask will generate good, strong lines that the classical Hough transform might miss.

Mean color. These features are simply the per-channel arithmetic means of the RGB color values for pixels contained within the quadrangle in the raw image.

Color standard deviation. These features are like the mean color features, but take the per-RGB-channel standard deviations across the quadrangle's pixels, instead of the mean.

Edge verticality. This feature evaluates the vertical edges of the quadrangle for how close they are to being orthogonal to the horizontal axis.

Minimum angle. This feature assigns a score to how close the minimum interior angle of the quadrangle is to 90 degrees. A perfect score would correspond to a rectangle.

These features may be normalized to a range between zero and one, and the quadrangle is scored, for example, using a machine learning classifier (which has been trained using labeled images of target boards) to generate a score. Higher scores represent better matches to a physical target board. From these scores, we perform a greedy search to produce a single quadrangle as our preferred target board candidate.

In accordance with some examples, automated target board detection proceeds in two phases: (1) preparation and (2) execution. In the preparation phase, the conferencing client 232 continuously monitors live video frames for areas that are likely to be target boards, using techniques that are fast and that can be run for approximately every input frame from the webcam 116. In some examples, during the preparation phase and as often as possible, the conferencing client 232 takes an individual frame and generates a "Uniformity-Plus-Brightness Signature Image" to find areas that are 1) large in the frame and 2) uniformly colored. This is accomplished by choosing a set of random coordinate points within the image and, for each point, performing a "flood fill" operation, where the color at the point extends out to fill as large a continuous area as it can before reaching pixels that are beyond a threshold of difference (like the paint bucket tool available in many drawing programs). Multiple Uniformity-Plus-Brightness Signature Images (e.g., acquired from different frames of video) are then combined into a single "Broad Region Color Mask" by a weighted average. The weighted average gives more recent Uniformity-Plus-Brightness Signature Images greater weight than older ones, e.g., by applying exponentially decreasing weights to older images in the weighted sum. As a result, brighter pixels in the Broad Region Color Mask correspond to pixels in the frame that have been "filled over" more, and thus hint towards more likely being part of a target board.

The execution phase may be initiated by user action or some other process. During the execution phase, the conferencing client 232 takes as input the Broad Region Color Mask generated in the preparation phase. From this mask, the conferencing client 232 takes a centroid of the brightest region as the most likely "target pixel." The target pixel provides an initial seed assumed to be internal to every quadrangle to be evaluated, including the target board region. Target board detection may then proceeds as follows: 1) strong line detection, 2) quadrangle feature generation, 3) quadrangle scoring.

In some examples, the participant 112(1) can employ any of the above-described manual techniques for adjusting the results of automatic detection of the target board, e.g., when detection is imperfect. For example, if automatic detection outlines only a portion of the target board, or the wrong board (e.g., if there is greater than one board in the room), the participant can drag edges and/or corners of the displayed quadrangle (or other closed shape) to snap to edges and/or corners of the target board as rendered in the video images. As before, strong edges and corners in the video images are made to easily attract edges and corners of the drawn quadrangle, so that they readily snap to the edges and corners of the video images without the participant 112(1) having to precisely position edges and corners individually.

In some examples, participants can also move entire quadrangles, i.e., as unified objects, rather than as individual edges and/or corners. As quadrangles are moved within the video images, their edges and corners are made to automatically snap to proximate respective strong edges and corners of quadrangles detected in the video images, with angles and edge lengths of the drawn quadrangles changing as needed (within predefined limits) to conform to angles and edge lengths in the video images.

What is claimed is:

1. A method of sharing physical target boards in electronic conferences, the method comprising:
    capturing video by a camera of a computing machine participating in an electronic conference, the camera oriented to include a physical target board in its field of view;
    transforming the captured video to generate output video, the output video providing an enhanced view of the physical target board; and
    transmitting the output video to a set of other computing machines participating in the electronic conference, to enable a user of each of the set of other computing machines to see the enhanced view of the physical target board from the respective computing machine,
    wherein the physical target board is oriented at an angle relative to the camera such that the camera does not have a direct, face-on view of the physical target board, and wherein transforming the captured video includes performing a perspective deskew operation to render images of the physical target board in the output video from a face-on perspective, and
    wherein transforming the captured video further includes:
    identifying a set of edges of the physical target board; and
    overlaying a border that follows the set of edges to visually accentuate the physical target board in the output video.

2. The method of claim 1, wherein transforming the captured video further includes at least one of (i) rendering video content of neighboring objects adjacent to the physical target board with reduced contrast and/or color saturation and (ii) rendering the physical target board with increased brightness and/or color saturation.

3. The method of claim 1, wherein transforming the captured video further includes removing video content showing neighboring objects of the physical target board, such that the physical target board appears alone in the output video.

4. The method of claim 3, wherein transforming the captured video further includes:
    identifying a background of the physical target board on which markings are made, the background having variations in color and brightness; and
    rendering the background, including the variations in color and brightness, with uniform color and brightness.

5. The method of claim 1, further comprising, prior to transforming the captured video, performing a board detection operation on the captured video to identify the physical target board within the field of view of the camera.

6. The method of claim 5, wherein performing the board detection operation includes:
    identifying a set of quadrangles within the field of view of the camera; and
    selecting a quadrangle, from the identified set of quadrangles, that has characteristics that most closely match a set of predetermined expected characteristics of physical target boards.

7. The method of claim 6, further comprising accepting user input to assist manually in identifying the physical target board within the field of view of the camera.

8. The method of claim 1, wherein transforming the captured video further includes:
generating, from the captured video, a board model that provides a representation of a set of markings made on the physical target board,
wherein the method further comprises superimposing the board model with live content from the captured video to generate combined content, the combined content showing the set of markings overlaid with any occluding object that blocks the set of markings.

9. The method of claim 8, wherein the act of superimposing includes computing a weighted sum of the board model with the live video content, wherein the board model has a greater weight in the weighted sum than does the live video content.

10. The method of claim 9, wherein transforming the captured video further includes, in response to an occluding object moving to reveal changes in the set of markings that were previously hidden behind the occluding object, updating the board model to reflect the revealed changes in the set of markings,
wherein the method further includes superimposing the updated board model with the live video content.

11. The method of claim 9, further comprising:
computing a delta image based on a difference between the live video content and the board model;
generating a large blob mask from the delta image, the large blob mask having a first value at a set of locations where occluding image content is present in the delta image and a second value at a set of locations where no occluding image content is present in the delta image; and
updating the board model based on the large blob mask, including adding the live video content to content of the board model at the set of locations where the large blob mask has the second value.

12. The method of claim 11, wherein the delta image includes a feature corresponding to an occluding object, the feature having an initial outline, and wherein generating the large blob mask includes performing a blurring operation and a thresholding operation based on the delta image, to cause the initial outline to become smoother.

13. The method of claim 11, wherein the delta image includes a feature corresponding to an occluding object, and wherein generating the large blob mask includes:
performing a convex hull operation on the feature, the convex hull operation circumscribing the feature within a fully-convex polygon; and
changing the value at one or more locations within the fully-convex polygon from the second value to the first value.

14. The method of claim 11, wherein the delta image includes a feature corresponding to an occluding object, and wherein generating the large blob mask includes:
analyzing the delta image to determine whether the feature intersects a location in the delta image that corresponds to an edge of the physical target board; and
in response to determining that the feature does not intersect any location corresponding to an edge of the physical target board, adding the feature to the board model.

15. The method of claim 11, wherein transforming the captured video further includes:
monitoring pixels of the live video over time; and
updating the board model to include any pixels of the live video that remain substantially constant for a predetermined period of time.

16. The method of claim 11, further comprising generating a summary series of still images of the output video that capture a sequence of changes in markings on the physical target board over a course of the electronic conference, wherein generating the summary series includes:
taking a first still image of the output video in response to detecting that multiple new marks were sequentially made on the physical target board and then that an erasure was made; and
taking a second still image of the output video in response to detecting that multiple new erasures were sequentially made from the physical target board and then that a new mark was made; and
providing the first still image and the second still image in the summary series.

17. The method of claim 8, wherein transmitting the output video to the set of other computing machines includes providing the output video in two video streams:
a first video stream conveying the board model; and
a second video stream conveying live content from the captured video,
wherein superimposing the board model with live content from the captured video is performed by each of the set of other computing machines by combining the first video stream with the second video stream.

* * * * *